United States Patent [19]

Snyder

[11] Patent Number: 4,686,951
[45] Date of Patent: Aug. 18, 1987

[54] METHOD AND APPARATUS FOR CARBURETION

[75] Inventor: Warren E. Snyder, Elm Grove, Wis.

[73] Assignee: Dresser Industries, Inc., Dallas, Tex.

[21] Appl. No.: 747,838

[22] Filed: Jun. 24, 1985

[51] Int. Cl.$^4$ .................. F02D 41/14; F02M 21/04
[52] U.S. Cl. .................................... 123/527; 123/589
[58] Field of Search ............. 123/344, 376, 440, 527, 123/528, 529, 589

[56] References Cited

U.S. PATENT DOCUMENTS

| | | | |
|---|---|---|---|
| 1,089,478 | 3/1914 | Kasley | 123/527 |
| 2,682,866 | 7/1954 | Rhoades, Jr. | 123/528 X |
| 2,729,205 | 1/1956 | Nichols | 123/528 |
| 2,921,570 | 1/1960 | Szlachcic et al. | 123/527 |
| 4,079,711 | 3/1978 | Hattori et al. | 123/589 |
| 4,096,839 | 6/1978 | Niertit | 123/440 |
| 4,169,441 | 10/1979 | Hirano et al. | 123/440 |

FOREIGN PATENT DOCUMENTS

| | | | |
|---|---|---|---|
| 137337 | 11/1978 | Japan | 123/527 |
| 123826 | 3/1919 | United Kingdom | 123/527 |

*Primary Examiner*—Tony M. Argenbright

[57] ABSTRACT

A fuel system includes a carburetor wherein the throttle valves for the air and fuel are located upstream of the mixing chamber and are moved conjointly to maintain the desired air/fuel ratio over a variation in engine speed. The desired changes in air/fuel ratio can be made by, in one embodiment, utilizing a throttle valve in an auxiliary air passageway whereby more or less air is added to the mixture and too, by providing for the relative angular displacement of the air throttle valve as compared to the full throttle valve while maintaining conjoint movement thereof once the desired air/fuel ratio has been attained.

5 Claims, 6 Drawing Figures

METHOD AND APPARATUS FOR CARBURETION

BACKGROUND OF THE INVENTION

This invention relates generally to improved air/fuel apparatus and methods for gaseous fueled engines. More particularly, but not by way of limitation, this invention relates to an improved method and apparatus for supplying desired fuel/air mixtures to a gaseous fueled engine.

Carburetors are currently available for use with gaseous fueled engines. Available carburetors have proved to be generally satisfactory, but there are certain problems in such carburetors that reduce the efficiency of the engines with which they are used. For example, in one type of carburetor, as the flow therethrough increases, the flow area is increased in an attempt to maintain a constant pressure drop through the system. As the air flow increases, the gas flow is increased through the use of a valve which increases the opening area. The pressure drop across the carburetor is much larger than desirable; therefore, the power available is reduced and the efficiency of the engine is accordingly reduced.

In other types of conventional carburetors, there is a large pressure drop in the venturi throat at high air flows. The pressure drop is small at low flows with the variation being approximately directly related to square of the flow. The variation in this pressure, and particularly at the idle speeds and low air flow values, the carburetor is extremely difficult to control because of the effect of relatively small changes in either the air or the gas being supplied.

So far as is known, none of the conventional carburetors have throttles for the air and gas located upstream of the mixing; none provide for the conjoint control of the air and fuel throttle valves to maintain a constant air/fuel ratio at low and high flows, and none provide for the independent variation of the air/fuel ratio while providing conjoint control to maintain the desired air/fuel ratio.

SUMMARY OF THE INVENTION

This invention provides an improved carburetor for a gaseous fueled engine wherein the engine includes an intake manifold. The carburetor comprises a body having inlet and outlet ends, an air passageway extending therethrough intersecting the ends, a fuel supply passageway for connection with the fuel supply, and a mixing chamber located adjacent to the outlet end and communicating with the air and fuel supply passageways. Fuel and air controls are located in the fuel supply and air passageway, respectively, for conjointly controlling flow through the passageways. An auxiliary control is provided for varying the air/fuel ratio to the intake manifold.

In another aspect, this invention provides an improved method for supplying air and fuel to a gaseous fueled engine that includes a carburetor, an intake manifold, and an exhaust system, the method comprising the steps of supplying substantially equal pressure air and fuel separately to the carburetor; conjointly controlling the flow of fuel and air through separate passageways in the carburetor; mixing the air and fuel to provide a predetermined air/fuel ratio to the engine; measuring the engine speed; conjointly changing the volume flow through the passageways in said carburetor to control the engine speed while maintaining the air/fuel ratio; measuring the oxygen content of burned air/fuel mixture; varying the relative volume flowing through the separate passageways to change the air/fuel ratio in response to the oxygen content in burned air/fuel mixture; and conjointly controlling flow of fuel and air in the separate passageways to maintain the new air/fuel ratio.

BRIEF DESCRIPTION OF THE DRAWING

The foregoing and additional objects and advantages of the invention will become more apparent as the following detailed description is read in conjunction with the accompanying drawing, wherein like reference characters denote like parts in all views and wherein.

DETAILED DESCRIPTION OF THE PREFERRED EMBODIMENT

Figure 1:
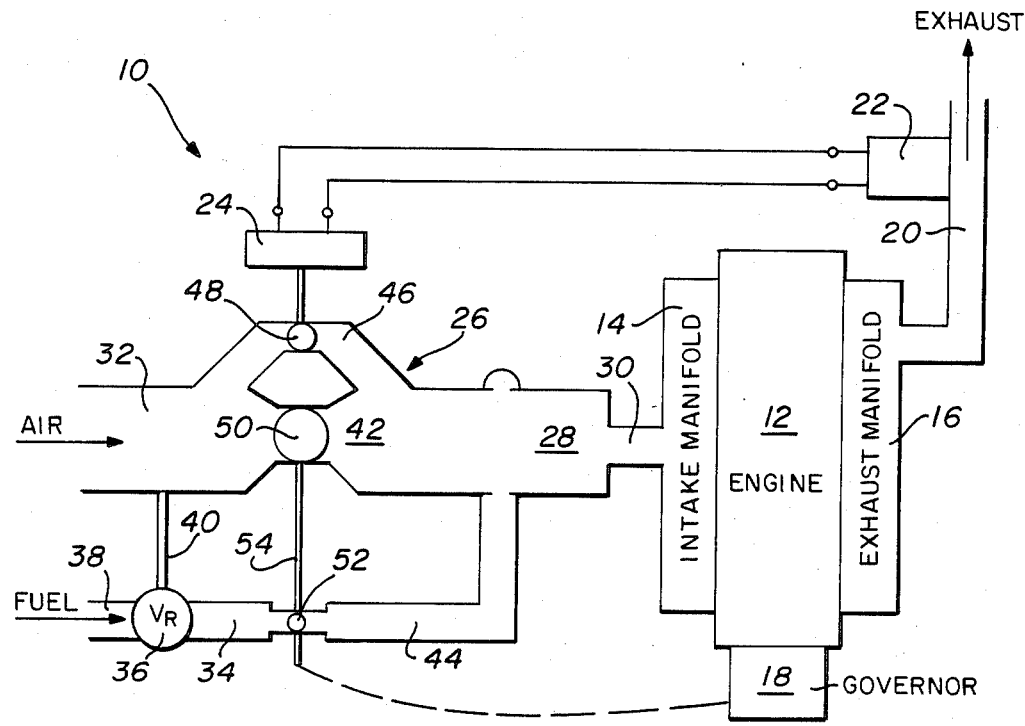
FIG. 1 is a schematic diagram illustrating an engine fuel system that is constructed in accordance with the invention.

Referring to the drawing, and to FIG. 1 in particular, shown therein and generally designated by the reference character 10 is an engine and fuel system that is constructed in accordance with the invention. The engine and fuel system 10 includes an engine 12 having an intake manifold 14, and an exhaust manifold 16.

The engine 12 includes a governor 18 which functions to maintain the engine speed at the desired level, an exhaust pipe 20 that is connected to the exhaust manifold 16, and an oxygen sensor 22 that is shown located in the exhaust pipe 20, but may be located in the manifold 16. The sensor 22 is provided to determine the oxygen content of exhaust gas in the exhaust pipe 20 and to transmit a signal representative of such oxygen content to a servo 24.

The engine and fuel system 10 includes a carburetor 26 that is mounted on the engine 12. The carburetor 26 includes a mixing chamber 28 which has its outlet 30 connected to the intake manifold 14 of the engine 12.

Figure 2:
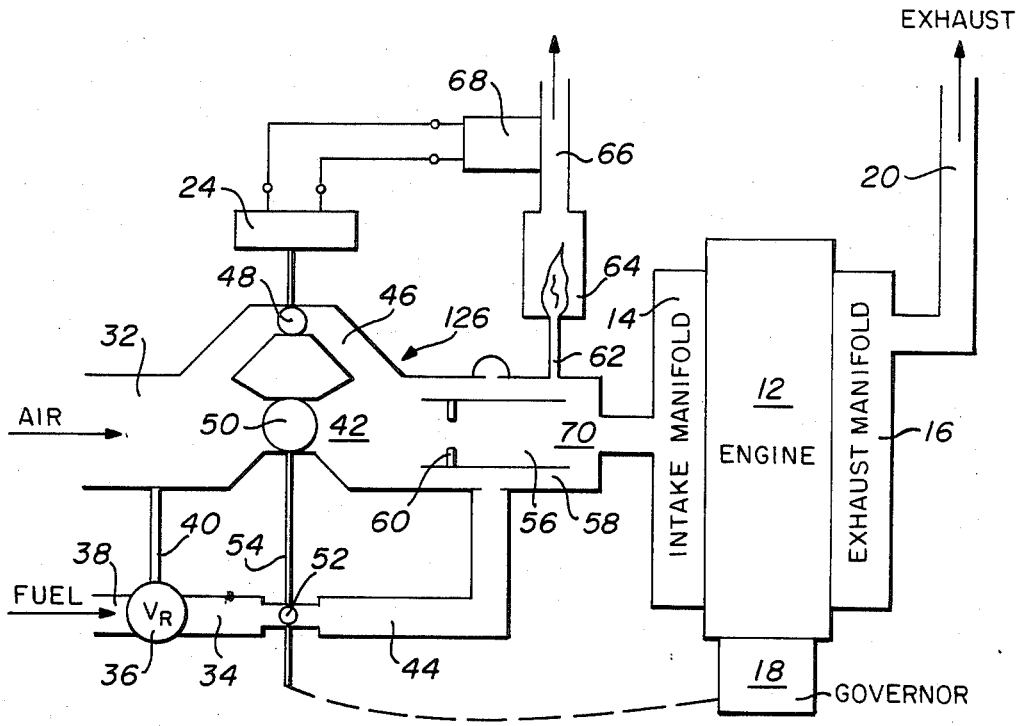
FIG. 2 is a schematic diagram illustrating another embodiment of a carburetion system that is also constructed in accordance with the invention.
Figure 3:
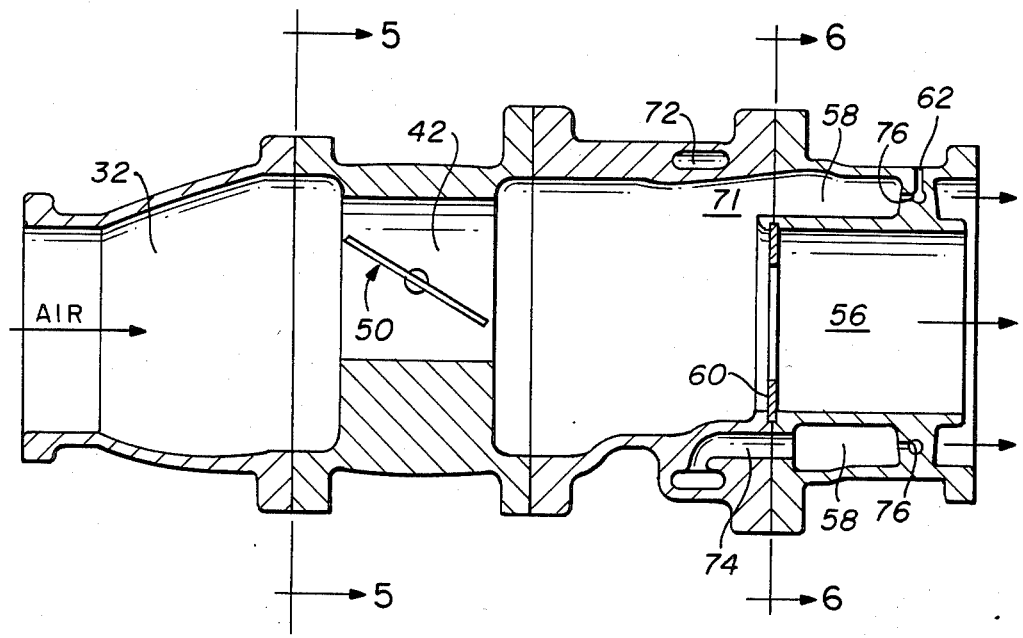
FIG. 3 is a side cross sectional view through the main air passageway of a carburetor utilized in the system of FIG. 2.

The carburetor 26 includes an air inlet 32 as shown in FIGS. 1, 2 and 3. A gas inlet 34 is connected through a pressure regulator 36 to a fuel supply 38. A sensing line 40 connects the regulator 36 to the air inlet 32.

In the schematic view of FIG. 1, it can be seen that a main air passageway 42 extends through the carburetor 26 and a generally parallel fuel passageway 44 also extends therethrough. An auxiliary air passageway 46 extends from the air inlet 32 of the carburetor 26 to a point intersecting the passageway 42 adjacent to the mixing chamber 28. The passageway 46 may extend into the mixing chamber if desired.

Located in the auxiliary air passageway 46 is a valve 48 that is actuated by the servo 24. The valve 48 is movable in the passageway 46 between a position entirely closing the passageway and a position wherein essentially full flow can occur therethrough.

A main air valve 50 is located in the air passageway 42 and is rotatable therein between positions closing the passageway 42 and providing essentially full flow therethrough. Similarly, a fuel valve 52 is located in the fuel passageway 44 and is also movable therein between the positions blocking the passageway 44 and providing full flow therethrough. The valves 50 and 52 are interconnected by a shaft 54 so that they move conjointly and are interconnected also with the governor 18 so that the governor 18 controls the positions of the valves 50 and 52. Although not illustrated, it is contemplated that some slight variation may need to be made between the relative angular position of the valves 50 and 52 even though they move conjointly. Thus, their positions may be adjusted relative to each other to provide a slightly different flow restriction through the passageways 42 and 44, respectively.

In the foregoing, sensor 22 is described as one determining the oxygen content of the exhaust gas. Any other measurement which indicates air-fuel ratio, such as temperature, can also be used. For stoichiometric combustion, a conventional zirconiumoxide sensor is the preferred embodiment. For lean combustion, other types of sensors can be used. Since the conventional zirconium-oxide sensor provides the most useful signal at stoichiometric combustion conditions, a second embodiment of the carburetor designated generally by the reference character 126 is shown in FIG. 2. This carburetor 126 differs from the embodiment of FIG. 1 in the way in which the air-fuel ratio is detected and controlled. In the carburetor 126 of FIG. 2, the mixing chamber is divided into two sections, an air passageway 56 and a stoichiometric air-fuel passageway 58. Air from the main passageway 42 and the auxiliary air passageway 46 is divided with a certain proportion of the flow passing through the air passageway 56 and the remainder passing through the stoichiometric air-fuel passageway 58. The proportionality or ratio between the flow in the passageways 56 and 58 is adjusted by an adjustable orifice 60.

In this embodiment, a small portion of the mixture from the stoichiometric air-fuel passageway 58 is withdrawn through a sampling tube 62 into a burner 64. The mixture is either burned as a flame or oxidized by a catalyst in the burner 64 with the exhaust gas from the burner 64 passing outwardly through an auxiliary exhaust 66. A sensor 68, such as a zirconium-oxide sensor, measures the oxygen content of the gas in the auxiliary exhaust 66 and produces a signal to control the servo 24. With this arrangement, and when the gas in the stoichiometric air-fuel passageway 58 is stoichiometric, the gas in the auxiliary exhaust 66 which is measured by the sensor 68 will also be stoichiometric.

If the mixture in the air-fuel passageway 58 differs from stoichiometric, the sensor 68 causes the servo 24 to adjust the position of the valve 48 to correct the air flow to bring the mixture back to stoichiometric. Additional air flows through the air passageway 56 and mixes with the stoichiometric air-fuel from passageway 58 in the mixing section 70, therefore, the fuel going to the intake manifold 14 is of a controlled lean composition while using the sensor 68 which is capable of sensing only stoichiometric conditions.

It will be noted that the modified form of the carburetion system illustrated in FIG. 2 includes many of the same components previously described in connection with the system of FIG. 1. Accordingly, such components are designated by the same reference characters and have not been discussed in detail in connection with FIG. 2.

The details of construction of the carburetor 126 are illustrated more fully in FIGS. 3 through 6. FIG. 3 is a longitudinal cross section through the main air passageway. Air enters from the left through the air inlet 32 and passes through the main air passageway 42 fitted with the main air valve 50. This air first combines with the air from the auxiliary air passageway 46 (see FIG. 2) and thereafter splits. Part of the total air flow passes into the air passageway 56 and part into the stoichiometric air-fuel passageway 58 through a plurality of entry sections 71.

The relative proportion of air in sections 56 and 58 is determined by the orifice 60. Simultaneously, gas from the fuel passageway 44 (see FIG. 2) enters a fuel distribution annulus 72 and passes through a plurality of fuel jets 74 into the stoichiometric air-fuel passageway 58. A continuous sample of the mixture in the stoichiometric air-fuel passageway 58 is collected through small sampling orifices 76 and collected in the sampling tube 62.

Figure 4:
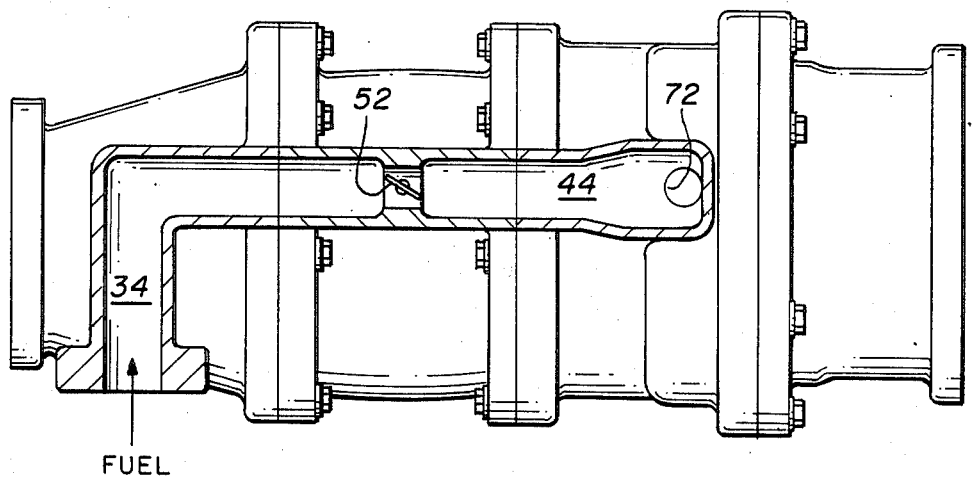
FIG. 4 is a side cross-sectional view through the main gas passageway of a carburetor utilized in the system of FIG. 2.

Further details of the carburetor are illustrated in FIG. 4 which is a longitudinal cross section through the gas passageway. Fuel enters through the gas inlet 34, passes around the fuel valve 52, and then through the fuel passageway 44 into the fuel distribution annulus 72 described earlier in connection with FIG. 3.

Figure 5:
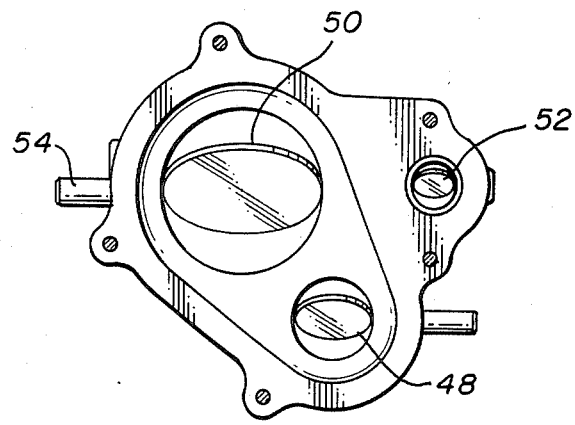
FIG. 5 is a cross-sectional view taken along the line 3—3 of FIG. 3.

FIG. 5 is a cross sectional view taken along the line 3—3 of FIG. 3 showing the main air valve 50 and the fuel valve 52 on a common throttle shaft 54 together with the auxiliary air valve 48.

Figure 6:
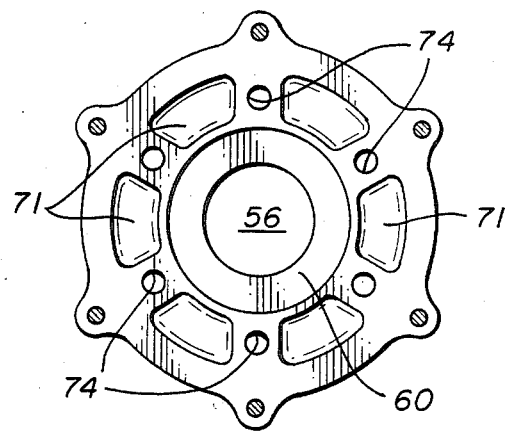
FIG. 6 is a cross-sectional view taken along the line 6—6 of FIG. 3.

FIG. 6 is a cross sectional view taken along the line 6—6 of FIG. 3 showing a plurality of air entry sections 71 and fuel jets 74. The orifice 60 is shown at the inlet to the air passageway 56.

It will be understood that the embodiments described in detail hereinbefore are presented by way of example only. Many changes and modifications can be made thereto without departing from the spirit or scope of the annexed claims.

What is claimed is:

1. An improved carburetor for a gaseous fueled engine wherein said engine includes an intake manifold and a fuel supply, said carburetor comprising:

a body having inlet and outlet ends, an air passageway extending therethrough intersecting said ends, a fuel supply passageway for connection with said fuel supply, and a mixing chamber located adjacent to said outlet end and communicating with said air and fuel supply passageways;

fuel and air control means located in said fuel supply and air passageway, respectively, for conjointly controlling flow through said passageways, said fuel and air control means including an air valve member located in said air passageway upstream of said mixing chamber, a fuel valve member located in said supply passageway upstream of said mixing chamber, and including a shaft rotatable in said body having both valve members mounted thereon for conjoint movement with said shaft; and, auxiliary control means for varying the air/fuel ratio to the intake manifold, said auxiliary control means including an auxiliary air passageway in said body extending from adjacent said inlet end to said mixing chamber a valve member located in said auxiliary air passageway upstream of said mixing chamber, and a shaft rotatable in said body having said last mentioned valve member mounted thereon.

2. The carburetor of claim 1 wherein the engine includes speed control means and said auxiliary control means includes:
   oxygen sensing means for transmitting signals representative of the oxygen content of the air/fuel ratio; and,
   means responsive to said signals for positioning the valve member in said auxiliary passageway to vary the air/fuel ratio in said mixing chamber.

3. The carburetor of claim 2 wherein said speed control means is operably connected to and simultaneously positions said valve members controlling said fuel and air.

4. The carburetor of claim 1 wherein said mixing chamber includes:
   a first passageway having a variable orifice therein for containing primarily air; and,
   a second passageway generally encircling said first passageway for containing an air and fuel mixture.

5. The carburetor of claim 4 and also including:
   oxygen sensing means connected with said second passageway for determining the oxygen content of said second passageway and transmitting a signal representative of such oxygen content; and,
   means responsive to such signals for positioning said air valve member in said auxiliary air passageway to vary the air/fuel ratio delivered to said engine.

* * * * *